United States Patent [19]

Box

[11] Patent Number: 4,679,819
[45] Date of Patent: Jul. 14, 1987

[54] TRAILER SUSPENSION SYSTEM

[76] Inventor: Clyde O. Box, 3898 N. Memorial, Tulsa, Okla. 74115

[21] Appl. No.: 824,607

[22] Filed: Jan. 31, 1986

[51] Int. Cl.⁴ .............................................. B60G 5/00
[52] U.S. Cl. .................................... 280/680; 280/686; 280/112 R
[58] Field of Search ............... 280/111, 112 R, 112 A, 280/676, 677, 680, 686

[56] References Cited

U.S. PATENT DOCUMENTS

| | | | |
|---|---|---|---|
| 3,033,589 | 5/1962 | Behnke | 280/680 |
| 3,147,023 | 9/1964 | Raymo | 280/43.23 |
| 3,317,226 | 5/1967 | Mosher | 280/686 |
| 3,367,677 | 2/1968 | Preddy, Jr. | 280/680 |
| 4,331,348 | 5/1982 | Raidel | 280/686 |

FOREIGN PATENT DOCUMENTS 311721  5/1929  United Kingdom ................ 280/680

*Primary Examiner*—John J. Love
*Assistant Examiner*—Kenneth R. Rice
*Attorney, Agent, or Firm*—Head, Johnson & Stevenson

[57] ABSTRACT

A suspension system for a trailer in which the trailer has a structural member running along each opposed side thereof, the suspension system having a shaft rotatably supported to each of the structural members, the shafts extending in a common axis opposite to each other, a rocker plate affixed to each of the shafts in a plane parallel to and spaced from the trailer structural member, each rocker plate having a recess in each end, a pair of rocker arms for each rocker plate, the inner ends of each rocker arm being pivotally received in a recess in the rocker plate whereby the rocker arms extend away from each other and in a common plane with the rocker plate to which they are attached, an elongated leaf spring supported above each of the rocker plates, the longitudinal center of each spring being supported to the rocker plate below it, a shackle pivotally connected to each end of the spring above each rocker plate and to a point spaced from the outer end of each rocker arm, and an axle affixed to each rocker arm adjacent the outer end thereof, each axle extending perpendicularly of the plane of the rocker arm to which it is affixed, each axle receiving a wheel thereon.

1 Claim, 6 Drawing Figures

TRAILER SUSPENSION SYSTEM

SUMMARY OF THE INVENTION

A type of suspension system frequently employed with trailers utilizes tandem wheels, that is, two wheels on each side of the trailer. To reduce vertical displacement of the trailer when traveling over uneven terrain the best tandem suspension systems provide for independent suspension of each wheel in the tandem set. For an example of a trailer suspension system which provides four wheels having independent suspension, reference may be had to U.S. Pat. No. 3,147,023 entitled "Trailer Suspension System".

One problem encountered with trailer suspension systems of the type disclosed in U.S. Pat. No. 3,147,023 is that of providing sufficient rigidity in the system to resist the torsional force imposed by the tandem supported trailer wheels while at the same time allowing free pivotation of the trailer support system. The present invention provides an improved tandem support system having improved means of maintaining the trailer suspension system in the selected planes of pivotation and which resist the torsional load applied by the wheel axles.

The suspension system is for use with a trailer having structural member running along and at the bottom edge of each of the opposed sides. The suspension system for each side is identical and includes a shaft rotatably supported to the trailer structural member and extending perpendicularly and outwardly from it. A rocker plate is affixed to the shaft in a plane parallel to and spaced from the trailer structural member. The rocker plate has a recess formed in each end thereof.

A pair of rocker arms are employed, each having an inner and an outer end and having opposed parallel sides and opposed top and bottom edges. The inner end of each of the rocker arms is pivotally received in a recess in the rocker plate. The rocker arms thereby extend away from each other and in a common vertical plane with the rocker plate and are free to pivot relative to the rocker plate in such common vertical plane.

An elongated leaf spring having opposed ends is supported above the rocker plate. The longitudinal center of the spring is secured to the rocker plate such as by the use of an inverted U-shaped structural spring retainer which is secured at its lower ends to the upper edge of the rocker plate.

A shackle is pivotally connected to each end of the spring and to a rocker arm at a point spaced from the outer end of the rocker arm so that the rocker arm is resiliently held in a pivoted relationship relative to the rocker plate by the spring.

An axle is affixed to each rocker arm adjacent the outer end thereof, each axle extending perpendicularly of the plane of the rocker arm to which it is attached, and each axle provides means for receiving a wheel thereon. Thus, there are a pair of rocker arms for each rocker plate and a pair of wheels for each rocker plate, the wheels being supported in a common vertical plane parallel to the plane of the rocker plate. The rocker plate, including the spring and the attached rocker arms, is free to pivot relative to the trailer structural member and each rocker arm is independently free to pivot relative to the rocker plate.

In the preferred arrangement each of the rocker plates has a pair of retainer plates affixed to it at each end forming side walls for the recesses in the rocker plate. Each rocker arm is pivoted to the retainer plates. Each rocker arm is preferably a substantially rectangular structural member having parallel side walls which are spaced apart slightly less than the spacing between the retainer plates so that the retainer plates function to guide the rocker arm but at the same time resist rotational torque tending to twist the rocker arm about its longitudinal axis.

Grease retainer members are affixed to each rocker arm upper and lower edge to resiliently engage the rocker plate so that each of the recesses in the rocker plate is closed to form a grease receiving chamber.

A better understanding of the invention will be had by reference to the following description and claims, taken in conjuction with the attached drawings.

DESCRIPTION OF THE PREFERRED EMBODIMENT

Figure 1:
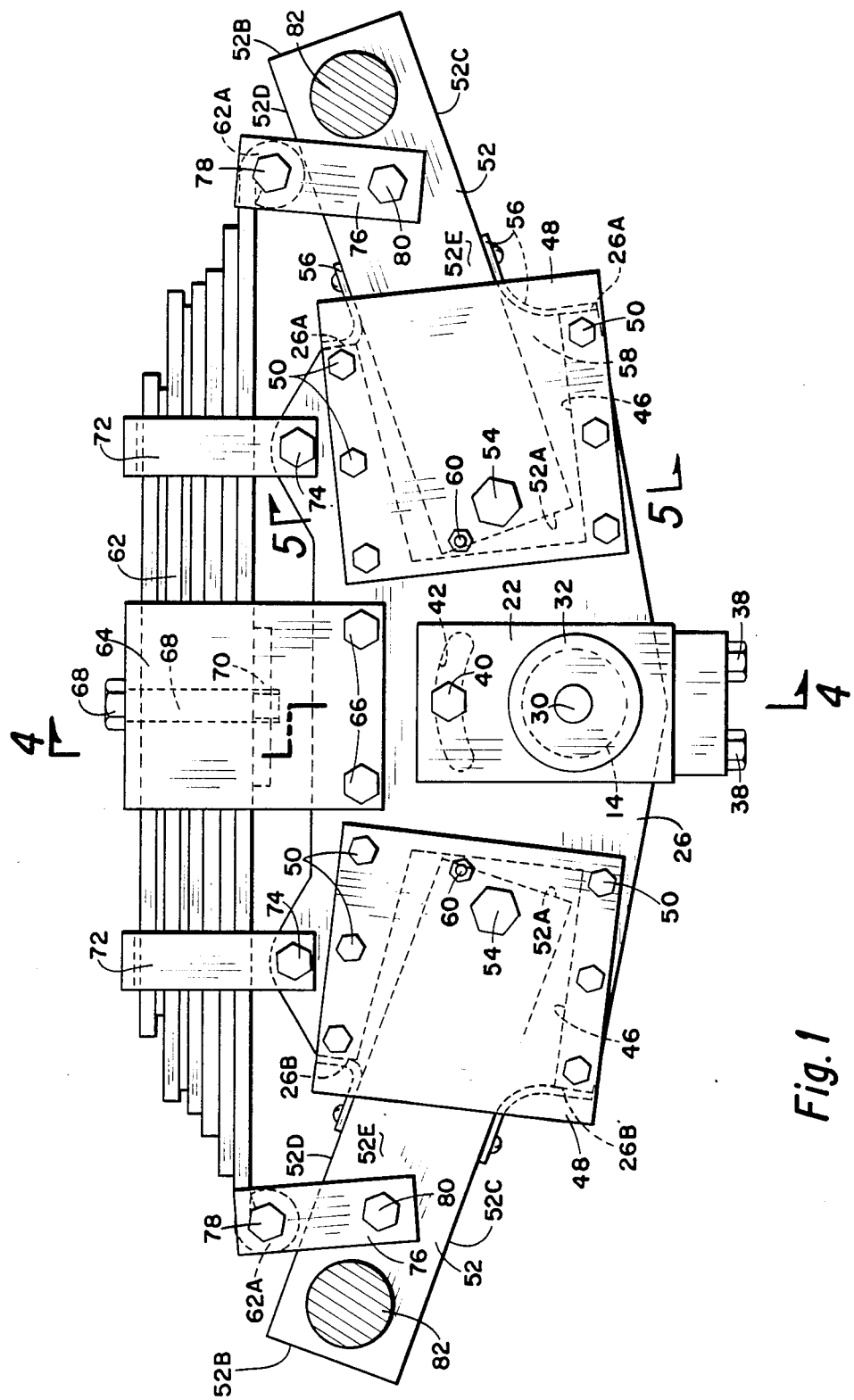
FIG. 1 is an elevational view of the trailers suspension system of this invention with the axles being shown but the wheels not being shown and with the trailer to which the suspension system is affixed also not being shown.
Figure 2:
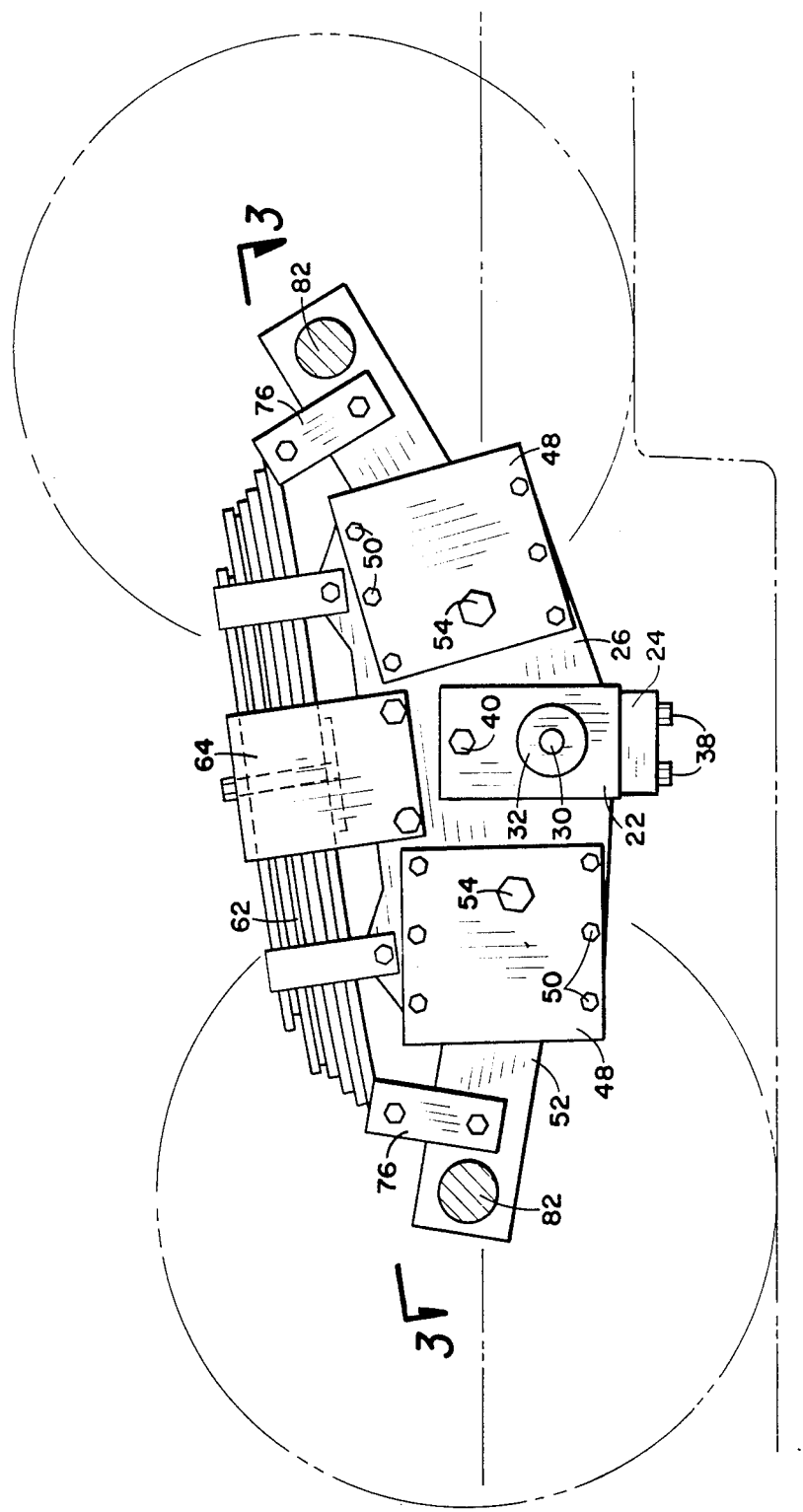
FIG. 2 is an elevational view as in FIG. 1 showing the trailer suspension system oriented when one of the tandem wheels is at an elevated position relative to the other.
Figure 3:
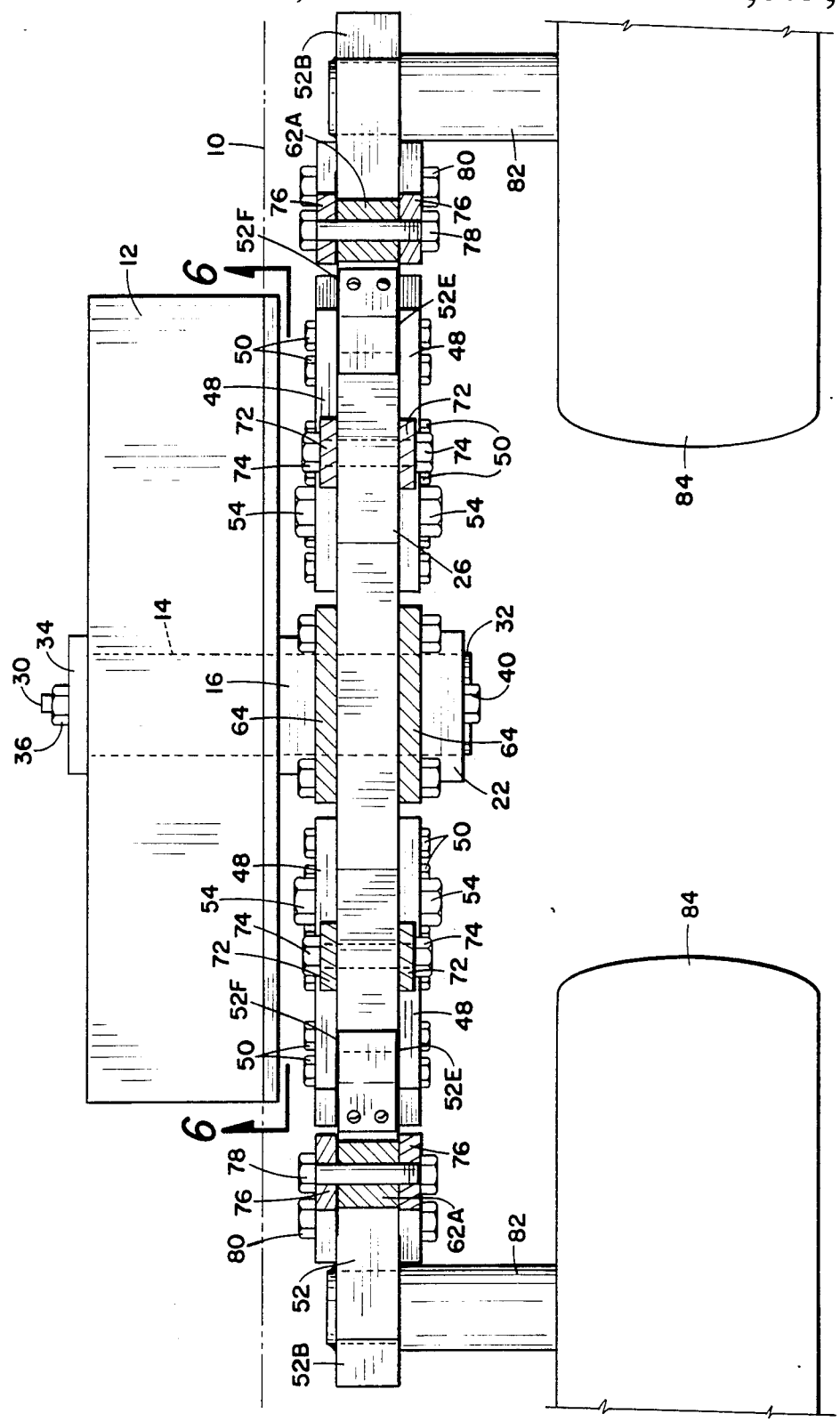
FIG. 3 is a generally horizontal cross-sectional view taken along the line 3—3 of FIG. 2.

Referring to the drawings and first to FIGS. 1, 2 and 3, an exemplary and preferred embodiment of the invention is illustrated, it being understood that the invention is not limited to the preferred embodiment set forth herein.

Figure 4:
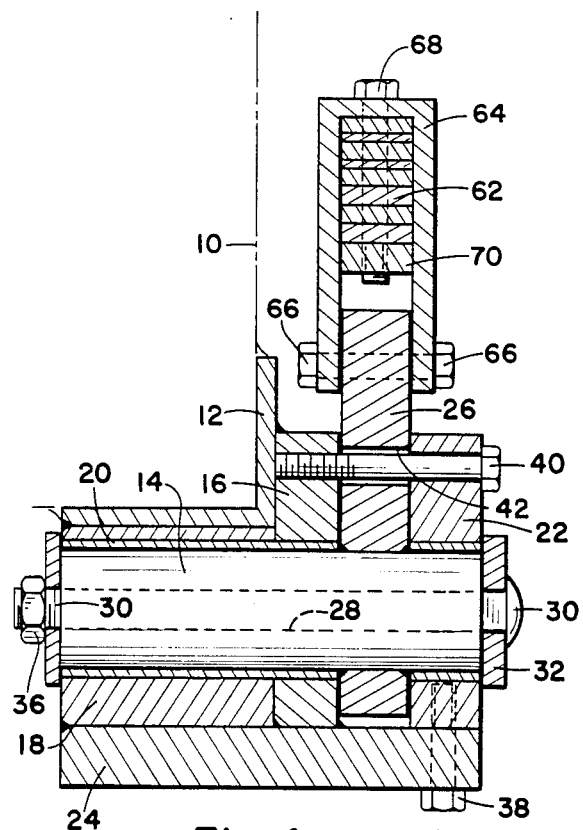
FIG. 4 is a vertical cross-sectional view taken along the line 4—4 of FIG. 1.
Figure 5:
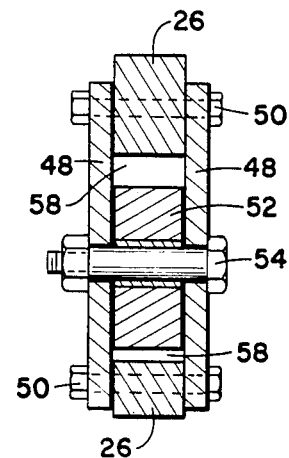
FIG. 5 is a generally vertical cross-sectional view taken along the line 5—5 of FIG. 1.

FIG. 3 discloses a trailer, one side of which is indicated by a dotted line identified by the numeral 10, the trailer having along each opposed side thereof a structural member 12 which may be, as illustrated, in the form of a steel angle. Rotatably supported to the steel angle is a shaft 14. While this may be accomplished in a variety of ways, FIG. 4 shows the employment of structural plates 16 and 18 supporting a tubular bearing 20. An additional structural plate 22 is supported to the assembly by a bottom plate 24. A space is provided between structural plates 16 and 22 which receives a rocker plate 26.

The shaft 14 has axial opening 28 which receives a bolt 30. Washers 32 and 34, each of which are larger in diameter than the shaft 14, are held in place by bolt 30 and nut 36. Bolts 38 secure the structural plate 24 to the vertical structural plate 22. A longer bolt 40, which is positioned in a threaded opening in the structure member 16, also retains the structural member 22 in the assembly. An elongated, arcuate slot 42 in the rocker plate 26 receives bolt 40. The assembly is arranged so that the rocker plate 26 is free to pivot in a vertical plane between the structural member 16 and 22 and thereby, free to pivot in a vertical plane relative to the trailer sides 10.

Figure 6:
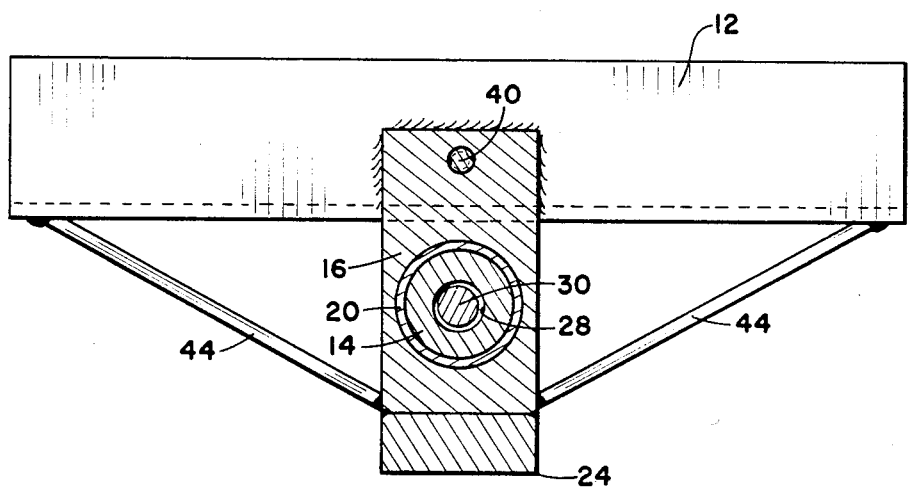
FIG. 6 is a vertical cross-sectional view taken along the line 6—6 of FIG. 3.

As shown in FIG. 6, the assembly is further supported to the trailer frame 12 by means of braces 44.

Each rocker plate 26 has a recess 46 at each end (See FIG. 1). A pair of retainer plates 48 are secured to each end of the rocker plate 26 covering the sides of recesses 46, the retainer plates being hold in plate by bolts 50.

Each of the tandem wheel suspension systems includes two rocker arms 52 each having an inner end 52A and an outer end 52B. The portion adjacent the inner end 52A is pivotally received in recesses 46 in the rocker arm and between retainer plates 48. A bolt 54, which extends through the retainer plates, and each rocker arm adjacent the inner end 52A, retains each rocker arm in pivotal relationship relative to the rocker plate.

Grease retainers 56 are secured to the upper and lower edges 52C and 52D of each of the rocker arms, the inner ends of the grease retainer slidably engage the ends 26A and 26B of the rocker plate. Thus, the area 58 within the recess 46 in each end of the rocker plate is closed and is adapted to receive grease therein, which may be injected through grease zerk 60. The rocker arms 52 are thereby pivotally retained relative to the rocker plate 26 in a lubricated manner and as previously indicated, in a manner to resist torsion. Each of the rocker arms 52 has parallel side walls 52E and 52F (See FIG. 3) which are parallel to each other and spaced apart a distance slightly less than the spacing between the retainer plates 48 so that the rocker arms are pivoted in a vertical plane of the rocker plate 26 but are supported against torsional displacement.

Supported above each of the rocker plates 26 is a leaf spring 62 held in place by a central inverted U-shaped bracket member 64 which in turn is attached at its lower end to the upper edge of the rocker plate 26 by bolts 66, the bracket member being best seen in FIGS. 1 and 4. A bolt 68 extends through the top of the bracket member 64 and spring 62 and is threadably received in an elongated nut 70. Inverted U-shaped clevices 72 extend around the springs at positions spaced from the bracket member 64. The clevices are supported to the rocker plate by bolts 74 and serve to provide overload force against spring 62, that is, the clevices 72 are dimensioned so that when the trailer has no load, or a light load, the clevices do not engage spring 62 but the spring is free to flex along its full length. When a heavy load flexes the spring a preselected amount the spring is engaged by the clevices 72 so that further flexing takes place only between the clevices and the outer end of the spring.

Each outer end of spring 62 has a coiled portion 62A. Spaced apart paralleled shackle plates 76 receive bolts 78 by which they are affixed to the coiled ends 62A of spring 62. The lower end of the shackle plates are secured to the rocker arms 52 at points spaced from the rocker arms outer ends 52B by means of bolt 80. In this manner the pivotal position of each of the rocker arms relative to the rocker plate is resiliently controlled by spring 62.

Affixed adjacent to the outer ends 52B of each of the rocker arms is an axle 82 adapted to support a wheel having a tire 84 thereon. Thus, the wheels are canti-levered out by the axle 82 which, when the trailer is loaded, puts torsional force on the rocker arms 52. By the arrangement of the relationship between the inner ends of the rocker arms and the recessed outer ends of the rocker plate the suspension system is configured to resist such torsional force so as to allow free independent suspension of each of the tandem supported wheels on each side of the trailer in a manner to maintain the suspension system in proper alignment.

The suspension system thus described provides an improved system. The tandem wheels are, as a unit, supported for pivotation about the shaft member 14 and each wheel is also independently pivotally supported relative to the rocker plate so that the maximum independence of movement is provided for the tandemly supported wheels.

By the nature of the suspension system of this invention the braking action of the trailer is greatly improved. While not shown in the drawings, each wheel will normally be equiped with either electrically or hydraulically actuated brakes. As each wheel brakes it tends to force its axle 82 upwardly, which tends to push the other axle downwardly. Thus, the braking action between the two wheels is equalized to achieve the most effective total braking force.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A tandem suspension system for a trailer in which the trailer has a structural member running along each opposed side thereof, the suspension system of each side comprising:

a shaft rotatably supported to the trailer structural member and extending perpendicularly and outwardly therefrom;

a rocker plate affixed to said shaft in a vertical plane parallel to and spaced from the trailer structural member, the rocker plate having a recess in each end;

a pair of rocker arms, each having an inner and an outer end, and having opposed parallel sides and top and bottom edges, the inner end of each rocker arm being pivotally received in a said recess in said rocker plate whereby the rocker arms extend away from each other and in a common plane with said rocker plate;

an elongated leaf spring having opposed ends, the spring being supported above said rocker plate;

shackles pivotally connecting each end of said spring to said rocker arm at a point spaced from the outer end thereof;

a pair of retainer plates secured to said each end of said rocker plate, each pair of retainer plates being secured to opposite sides of said retainer plate at a said recess therein in opposed paralleled relationship, the inner end of each of said rocker arms being received between a pair of retainer plates, the inner end of each rocker arm and each pair of retainer plates having aligned openings therein;

a bolt received in said aligned opening in each pair of retainer plates and said rocker arm received therebetween whereby each rocker arm is pivoted to a said pair of retainer plates, and wherein each of said rocker arms is formed of an elongated member having opposed paralleled side walls spaced apart a distance slightly less than the spacing between said retainer plates whereby said retainer plates guide the pivotal movement of said rocker arms in the plane of said rocker plate;

a grease retainer member affixed to the top and bottom edge of each of said rocker arms, each grease retainer slideably and sealably engaging said rocker plate, the said recess in each end of said plate being thereby closed and forming a grease receiving cavity; and an axle affixed to each rocker arm adjacent the outer end thereof, each axle extending perpendicular to the plane of said rocker arms, each axle providing means to receive a wheel thereon.

* * * * *